(12) United States Patent
Li et al.

(10) Patent No.: US 8,795,550 B2
(45) Date of Patent: Aug. 5, 2014

(54) METHOD FOR PREPARING CATHODE ACTIVE MATERIAL

(75) Inventors: Ya-Dong Li, Beijing (CN); Qing Peng, Beijing (CN); Zhong-Bin Zhuang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1238 days.

(21) Appl. No.: 12/647,643

(22) Filed: Dec. 28, 2009

(65) Prior Publication Data
US 2011/0073803 A1 Mar. 31, 2011

(30) Foreign Application Priority Data
Sep. 30, 2009 (CN) .......................... 2009 1 0190572

(51) Int. Cl.
*H01M 4/02* (2006.01)
*H01M 4/136* (2010.01)

(52) U.S. Cl.
USPC ................... 252/182.1; 429/221; 429/231.95

(58) Field of Classification Search
USPC ............................ 252/182.1; 429/221, 231.95
See application file for complete search history.

(56) References Cited

U.S. PATENT DOCUMENTS

| 6,986,968 B2 * | 1/2006 | Hong et al. .................. 429/221 |
| 2006/0147365 A1 | 7/2006 | Okada et al. |
| 2006/0263286 A1 * | 11/2006 | Wu et al. ....................... 423/306 |
| 2007/0134554 A1 | 6/2007 | Armand et al. |
| 2009/0148765 A1 * | 6/2009 | Cao et al. ....................... 429/163 |
| 2010/0055554 A1 * | 3/2010 | Makidera et al. ............. 429/144 |

FOREIGN PATENT DOCUMENTS

| CN | 1837033 | 9/2006 |
| CN | 101112979 | 1/2008 |
| CN | 101442117 | 5/2009 |
| JP | 2004509058 | 3/2004 |
| JP | 2008004317 | 1/2008 |
| WO | WO2004/036671 | 4/2004 |
| WO | WO 2008062895 A1 * | 5/2008 |

OTHER PUBLICATIONS

English machine translation of CN 101112979 (Jan. 30, 2008).*
Padhi et al., Effect of structure on the Fe3+/Fe2+ redox couple in iron phosphates, Journal of the Electrochemical Society, 1997, vol. 144, No. 5, p. 1609-p. 1613.
Huang Bin-Zhao, LiFePO4 Incorporated Mesoporous Carbon used as Cathod Material for Lithium Ion Battery, National Taiwan University of Science and Technology, Chemical Engineering Department, Jul. 2008, Abstract on p. 3 may be relevant.

* cited by examiner

*Primary Examiner* — Peter F Godenschwager
(74) *Attorney, Agent, or Firm* — Novak Druce Connolly Bove + Quigg LLP

(57) ABSTRACT

A method for preparing a cathode active material includes mixing a phosphorus source material, a lithium source material, and a dispersing agent together to form a first liquid mixture. An iron powder is added into the first liquid mixture. The first liquid mixture with the iron powder therein is dried to achieve a precursor. The precursor is calcined in a protective gas at a temperature of about 600° C. to about 800° C. for more than about 2 hours.

9 Claims, 1 Drawing Sheet

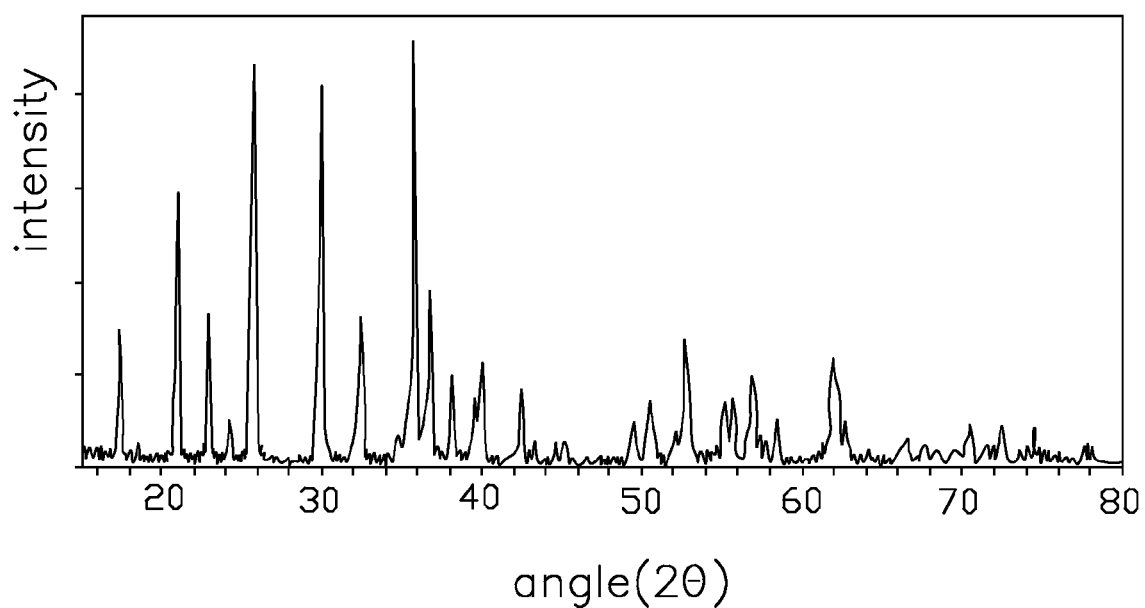

METHOD FOR PREPARING CATHODE ACTIVE MATERIAL

CROSS-REFERENCE TO RELATED APPLICATIONS

This application claims all benefits accruing under 35 U.S.C. §119 from China Patent Application No. 200910190572.X, filed on 2009 Sep. 30 in the China Intellectual Property Office.

BACKGROUND

1. Technical Field

The present disclosure relates to a method for preparing cathode active materials of batteries and, particularly, to a method for preparing a cathode active material of a lithium battery.

2. Description of Related Art

In recent years, lithium batteries have received a great deal of attention. Lithium batteries are used in various portable devices, such as notebook PCs, mobile phones, and digital cameras because of their small weight, high discharge voltage, long cycle life, and high energy density compared with conventional lead storage batteries, nickel-cadmium batteries, nickel-hydrogen batteries, and nickel-zinc batteries.

A lithium battery is made up of a cathode and an anode, each having an active material capable of reversibly doping/un-doping at the least, lithium ions and a non-aqueous electrolyte. The charging reaction of the lithium battery process includes lithium ions being deintercalated into an electrolyte solution at the cathode active material and are intercalated into the anode active material. In discharging, an opposite reaction to that of the charging reaction proceeds, such that lithium ions are intercalated at the cathode.

At present, the most widely used cathode active materials are spinel type lithium manganese oxide (e.g. $LiMn_2O_4$), olivine type lithium iron phosphate (e.g. $LiFePO_4$), and layered type lithium cobalt oxide (e.g. $LiCoO_2$). $LiFePO_4$ has a volumetric density as high as 3.6 $g/m^3$ and generates a high potential of 3.4 V, with a theoretical capacity as high as 170 mAh/g. Further, $LiFePO_4$ includes iron, an inexpensive material plentiful in supply, in its composition, and therefore is less costly. There are many methods which have been proposed for preparing $LiFePO_4$ such as a solid state synthesis method, a hydrothermal synthesis method, a chemical co-precipitation synthesis method, and a microwave synthesis method. However, most of the above described methods have mass production problems.

What is needed, therefore, is to provide a simple and low cost method for preparing the cathode active material which is suitable for mass production.

BRIEF DESCRIPTION OF THE DRAWING

Many aspects of the embodiments can be better understood with reference to the following drawing. The drawing is not necessarily drawn to scale, the emphasis instead being placed upon clearly illustrating the principles of the embodiments.

The FIGURE is a graph showing a result of X-ray diffractometry of the cathode active material made by one embodiment of a method.

DETAILED DESCRIPTION

The disclosure is illustrated by way of example and not by way of limitation. It should be noted that references to "an" or "one" embodiment in this disclosure are not necessarily to the same embodiment, and such references mean at least one.

Referring to the FIGURE, one embodiment of a method for preparing a $LiFePO_4$ as a cathode active material includes:

S10: mixing a phosphorus source material, a lithium source material, and a dispersing agent together to form a first liquid mixture;

S11: adding an iron powder into the first liquid mixture;

S12: drying the first liquid mixture with the iron powder therein to achieve a precursor;

S13: calcining the precursor in a protective gas at a temperature of about 600° C. to about 800° C. for more than about 2 hours.

In step S10, the phosphorus source material includes at least one of phosphoric acid ($H_3PO_4$) and phosphate. The phosphate can be ammonium dihydrogen phosphate ($NH_4H_2PO_4$) or lithium dihydrogen phosphate ($LiH_2PO_4$). The lithium source material can be lithium hydroxide (LiOH) or lithium salt such as lithium carbonate ($Li_2CO_3$) or lithium dihydrogen phosphate ($LiH_2PO_4$). The dispersing agent can be at least one of hydrochloric acid (HCl) solution, dilute sulfuric acid ($H_2SO_4$) solution, water, distilled water, and anhydrous ethanol. By combining the phosphorus source material, the lithium source material and the dispersing agent, the first liquid mixture is an acid liquid or dilute acid liquid with hydrogen ions therein. The hydrogen ions comes from at least one of the phosphorus source material, the lithium source material, and the dispersing agent.

In step S11, the iron powder is a simple substance in powder form that only includes the Fe element. By adding the iron powder into the first liquid mixture, the hydrogen ions can oxidize the iron powder to a 2-valence iron ($Fe^{2+}$). The molar ratio of P, Li, and Fe elements in the first liquid mixture is in a range from 1:1:1 to 1:1:1.2.

After step S11, an optional step S112 of stirring the first liquid mixture with the iron powder at a temperature of about 80° C. to about 100° C. for more than about 10 hours can be further processed. In one embodiment, the stirring temperature is about 95° C., and the stirring time is about 24 hours. The first liquid mixture can be stirred mechanically, electromagnetically, or ultrasonically.

In step S12, the drying step can be processed by a method such as evaporation, spray drying, and filtration. After the drying step, the precursor is an amorphous $LiFePO_4$.

After step S12, an optional step S121 of washing the precursor with distilled water, washing the precursor with ethanol, and drying the precursor can be employed. The unreacted phosphorus source material, lithium source material, and impurities of iron powder can be removed by washing with the distilled water. The precursor can be easily dried by washing with the ethanol. The washed precursor can be dried at a temperature below 200° C., such as in an oven or in a room. In one embodiment, the drying temperature is about 60° C.

In step S13, the protective gas can be made up of at least one of nitrogen ($N_2$) and a noble gas. The precursor can be calcined in a tube furnace with a gas inlet and a gas outlet to introduce the protective gas. After calcining, a crystal state $LiFePO_4$ can be obtained.

An example of the method for preparing the $LiFePO_4$ cathode active material is disclosed. About 10 millimole (mMol) $H_3PO_4$ and about 10 mMol LiOH are added into about 50 ml distilled water to form the first liquid mixture. About 10 mMol iron powder is then added into the first liquid mixture. The first liquid mixture with the iron powder therein is ultrasonically stirred for about 24 hours and then filtrated by filter paper to obtain the precursor on the filter paper. The precursor is washed by the distilled water and ethanol, and then dried in an oven at about 60° C. The washed precursor is calcined in the tube furnace at a 700° C. for about 2 hours. The product can be shown to be $LiFePO_4$ cathode active material by X-ray diffractometry, as shown in the FIGURE.

A method for preparing a doped $LiFePO_4$ of one embodiment as an cathode active material includes:

S20: mixing a phosphorus source material, a lithium source material, and a dispersing agent together to form a first liquid mixture;

S21: adding an iron powder and a doping metal salt into the first liquid mixture;

S22: drying the first liquid mixture with the iron powder and the doping metal salt therein to achieve a doped precursor;

S23: calcining the doped precursor in a protective gas at a temperature of about 600° C. to about 800° C. for more than about 2 hours.

Steps S20 through S23 in the embodiment is similar to step S10 through S13. However, in step S21, the doping metal salt is added with the iron powder into the first liquid mixture. The doping metal salt containing a dopant element can be zinc nitrate, chromium nitrate, copper nitrate, calcium nitrate, manganese nitrate, lead nitrate, nickel nitrate, cobalt nitrate, or combinations thereof. Z represents a total molar number of the dopant element and the Fe element. The molar ratio of P element, Li element, and Z in the first liquid mixture is in a range from 1:1:1 to 1:1:1.2. The molar percentage of the dopant element in Z is in a range from about 0 to about 20%. In one embodiment, the molar ratio of dopant element and Fe element can be 5:95, 1:9, or 2:8. In step S23, the doped $LiFePO_4$ crystal can be achieved, with a formula $LiFe_xM_{1-x}PO_4$. M represents the dopant element, and X represents a molar number of Fe element in 1 mole $LiFe_xM_{1-x}PO_4$, and 1−X represents a molar number of dopant element M in 1 mole $LiFe_xM_{1-x}PO_4$. The $LiFe_xM_{1-x}PO_4$ has better electrical conductivity than $LiFePO_4$.

One embodiment of a method for preparing a carbon coated $LiFePO_4$ as a cathode active material includes:

S30: mixing a phosphorus source material, a lithium source material, and a dispersing agent together to form a first liquid mixture;

S31: adding an iron powder into the first liquid mixture;

S32: drying the first liquid mixture with the iron powder therein to achieve a precursor;

S33: disposing the precursor into a solution with a carbon source material therein to form a second liquid mixture;

S34: drying the second liquid mixture to achieve a carbon source material coated precursor;

S35: calcining the carbon source material coated precursor in a protective gas at a temperature of about 600° C. to about 800° C. for more than about 2 hours.

In step S34, the carbon source material coated precursor is an amorphous $LiFePO_4$ with a carbon source material film coated thereon. In step S35, by calcining, a composite of the crystal state $LiFePO_4$ with an amorphous carbon coating the surface thereof is achieved.

In step S33, the carbon source material can be at least one of glucose, polyvinyl alcohol, phenolic resin, urea-formaldehyde resin, fructose, sucrose, epoxy resin, polyvinyl alcohol, polyacrylamide, poly acetylene, polypyrrole, polyphenylene ammonium, lactose, and any other organic compound which can be decomposed to carbon.

In step S33, the second liquid mixture can be stirred to uniformly mix the precursor and the solution. In step S34, the second liquid mixture can be dried by a method of evaporation, spray drying, or filtration.

One embodiment of a method for preparing a carbon coated $LiFePO_4$ as a cathode active material includes:

S40: mixing a phosphorus source material, a lithium source material, and a dispersing agent together to form a first liquid mixture;

S41: adding an iron powder into the first liquid mixture;

S42: drying the first liquid mixture with the iron powder therein to achieve a precursor;

S43: calcining the precursor in a protective gas at a temperature of about 600° C. to about 800° C. for more than about 2 hours to achieve a $LiFePO_4$ crystal;

S44: disposing the $LiFePO_4$ crystal into a solution with a carbon source material therein to form a third liquid mixture;

S45: drying the third liquid mixture to achieve a carbon source material coated $LiFePO_4$ crystal;

S46: calcining the carbon source material coated $LiFePO_4$ crystal in a protective gas at a temperature of more than about 400° C.

One embodiment of a method for preparing a carbon coated and doped $LiFePO_4$ as a cathode active material includes:

S50: mixing a phosphorus source material, a lithium source material, and a dispersing agent together to form a first liquid mixture;

S51: adding an iron powder and a doping metal salt into the first liquid mixture;

S52: drying the first liquid mixture with the iron powder and the doping metal salt therein to achieve a doped precursor;

S53: disposing the doped precursor into a solution with a carbon source material therein to form a fourth liquid mixture;

S54: drying the fourth liquid mixture to achieve a carbon source material coated doped precursor;

S55: calcining the carbon source material coated doped precursor in a protective gas at a temperature of about 600° C. to about 800° C. for more than about 2 hours.

One embodiment of a method for preparing a carbon coated and doped $LiFePO_4$ as a cathode active material includes:

S60: mixing a phosphorus source material, a lithium source material, and a dispersing agent together to form a first liquid mixture;

S61: adding an iron powder and a doping metal salt into the first liquid mixture;

S62: drying the first liquid mixture with the iron powder and the doping metal salt therein to achieve a doped precursor;

S63: calcining the doped precursor in a protective gas at a temperature of about 600° C. to 800° C. for more than about 2 hours to achieve a doped $LiFePO_4$ crystal;

S64: disposing the doped $LiFePO_4$ crystal into a solution with a carbon source material therein to form a fifth liquid mixture;

S65: drying the fifth liquid mixture to achieve a carbon source material coated doped $LiFePO_4$ crystal;

S66: calcining the carbon source material coated doped $LiFePO_4$ crystal in a protective gas at a temperature of more than about 400° C.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for preparing a cathode active material, the method comprising:

mixing a phosphorus source material, a lithium source material, and a dispersing agent together to form a first liquid mixture, the dispersing agent is at least one of ethanol and water;

adding an iron powder into the first liquid mixture to form a second mixture consisting of iron powder, phosphorus source material, lithium source material, and dispersing agent;

stirring the second mixture at a temperature of about 80° C. to about 100° C. for more than about 10 hours;

drying the second mixture to achieve a precursor;

calcining the precursor in a protective gas at a temperature of about 600° C. to 800° C. for more than about 2 hours to achieve a $LiFePO_4$ crystal;

disposing the $LiFePO_4$ crystal into a solution with a carbon source material therein to form a third liquid mixture;

drying the third liquid mixture to achieve a carbon source material coated LiFePO4 crystal; and calcining the carbon source material coated $LiFePO_4$ crystal in a protective gas at a temperature more than about 400° C.

2. The method of claim 1, wherein the carbon source material is selected from the group consisting of glucose, polyvinyl alcohol, phenolic resin, urea-formaldehyde resin, fructose, sucrose, epoxy resin, polyvinyl alcohol, polyacrylamide, poly acetylene, polypyrrole, polyphenylene ammonium, lactose, and combinations thereof.

3. The method of claim 2, wherein a doping metal salt is added into the first liquid mixture with the iron powder.

4. The method of claim 1, wherein the phosphorus source material comprises at least one of phosphoric acid and phosphate.

5. The method of claim 4, wherein the phosphate is ammonium dihydrogen phosphate or lithium dihydrogen phosphate.

6. The method of claim 1, wherein the lithium source material is lithium hydroxide or lithium salt.

7. The method of claim 6, wherein the lithium salt is lithium carbonate or lithium dihydrogen phosphate.

8. The method of claim 1, wherein a molar ratio of P, Li, and Fe elements in the first liquid mixture is in a range from 1:1:1 to 1:1:1.2.

9. The method of claim 1, further comprising washing the precursor with distilled water, washing the precursor with ethanol, and drying the precursor.

* * * * *